Patent text

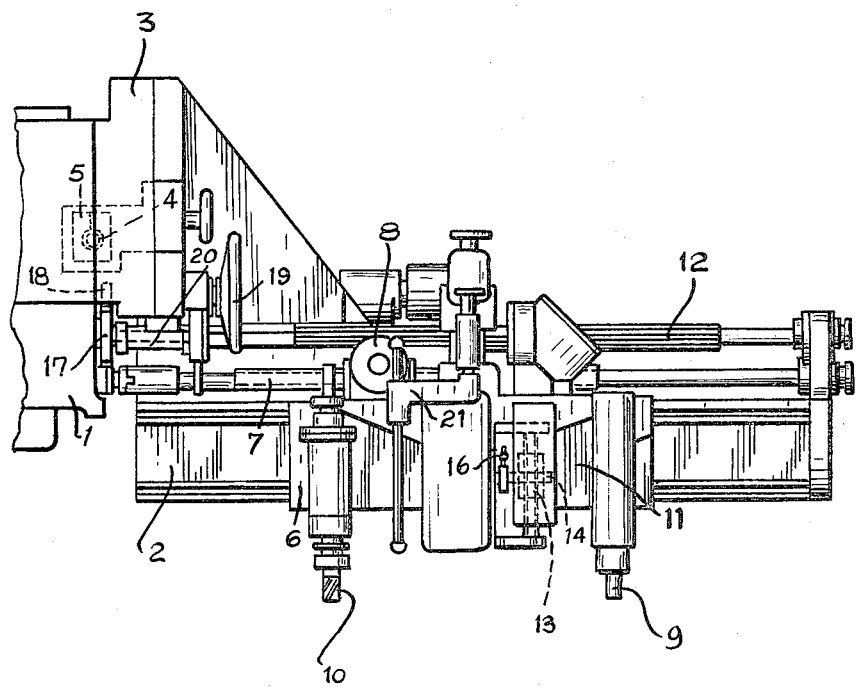

3,233,520
COPY MILLING MACHINES
Wilhelm Brandstätter, Frankfurt am Main, Germany, assignor to Maschinenfabrik Michael Kampf K.G., Bad Homburg, Hesse, Germany, a German company
Filed May 4, 1964, Ser. No. 365,853
Claims priority, application Germany, May 4, 1963,
M 56,697
3 Claims. (Cl. 90—13)

In addition to manually-operable, three-dimensionally operating mould copy milling machines, the adjusting means of which are also adapted to be individually fixed in position from being freely adjustable, power-operated copy milling machines are also known wherein a power-driven sensing means scans the pattern or model, during which procedure current pulses control the various motors for the longitudinal or transverse feed or for the vertical adjustment. Switching on and off is generally effected via magnetic clutches.

The manually-controlled machines require an operator in continual control, whereas in the case of fully-automatic machines one operator is able to supervise a multiplicity of such machines, it being merely necessary, at the end of the working operation, to replace the machined workpiece by a new blank and to restore the working members into the starting position.

There are, however, many copying patterns which cannot be scanned in an automatic working operation on fully-automatic, power-driven copy milling machines and "worked out" by the milling cutter. The patterns and workpieces must then be transferred to and set up anew on a hand machine, whilst the workpieces are still in an only partly machined state. This means a considerable loss of time and long stoppage time.

An object of the invention is to provide a novel design of a mould copy milling machine, the constituent parts of which are automatically operable, power-driven and three-dimensionally alignable, the machine being convertible by simple means to a machine which can be manually operated and which permits free movability in all three co-ordinate directions.

This object is achieved in accordance with the invention in such manner that, in the case of a fully-automatic, three-dimensionally operating mould copy milling machine having a power-driven sensing means controlling the three driving units, the said sensing means is adapted to be replaced by a rigid sensing means, whereas furthermore the drive couplings are adapted to be disengaged, the transverse feed is adapted to be adjusted by means of a rack and pinion drive and the longitudinal and also the vertical feed are adapted to be adjusted by means of a control lever associated with both drives.

Thus, in addition to the conventional spindle drive for the transverse feed in power driving, and the rack and pinion drive known in connection with manually operated machines and also the control lever for longitudinal and vertical adjustment known in connection with hand operation, it is merely necessary to provide also a rigid mechanical sensing means for the change-over of the machine, so that any kind of new construction is unnecessary, since all these parts of the manually operating machine are known.

The novel design or construction is discussed in greater detail hereinbelow, with reference to the drawing which shows a front elevational view of the cantilever arm. The drawing is in diagrammatic form, since the design of the various driving elements and means is otherwise known.

Adjustably guided on the machine upright 1, in a dovetail guide (not shown) is the cross-slide 3 carrying the cantilever arm. For the drive, controlled by a power-operated sensing means, of the slide 3, use is made of a spindle 4 which is mounted on the machine upright or standard 1, is adapted to be connected via a magnetic clutch to a power drive and with which there is associated on the slide 3 a lock nut 5. The work slide 6 is displaceably guided on the cantilever arm 2 and is adapted to be driven thereon by a spindle 7 which is mounted thereon and which is adapted to be connected to a motor via a magnetic clutch. Guided on the spindle 7 is a lock nut 8 which is releasable.

The sensing means 9 and the milling cutter 10 are, for common actuation, guided for vertical adjustment on the work slide 6 by means of a pusher member 11, the pusher member 11 which carries them being adjustable in that direction by means of a splined shaft 12 and by means of a spindle drive 13, 14.

In the case of a fully-automatic machine, all three adjustment possibilities are controlled by the power-driven sensing means mounted on the pusher member 11.

According to the invention, the drive nuts 5 and 8 and also the spindle drive 13, 14 are made releasable by the drawing-off of a clamping wedge 16, so that therefore the automatic drive of the three direction movements can be disconnected.

In order to be able to operate the machine thus disconnected from the automatic drive in the manner of a manually-actuated machine, the cross-slide 3 is connected to the machine standard 1 via a rack and pinion connection 17, 18, the pinion 17 of which is disposed on an adjusting shaft 20, adapted to be driven by a handwheel 19, of the cross-slide, such as is known for manually-actuated copy milling machines of the type discussed here. On releasing the lock nut 8 and the clamping wedge 16, the slide 6 and the vertical pusher member 11 become freely movable.

For the control thereof, use is then made of the hand control lever 21, which is known from manually-actuated machines and which is articulated to the machine standard and controls the longitudinal feed and the vertical adjustment in known manner.

I claim:
1. A mould copy milling machine which is convertible between automatic and manual operation, said machine comprising a body, three slides adjustable along respective mutually perpendicular axes constituting vertical, horizontal and transverse axes, cutting means supported on the slide which is adjustable along the vertical axis, sensing means on the latter slide for controlling the adjustment of said slides, adjusting means for adjusting the position of the slides along their respective axes, motor means for driving each of the adjusting means, means for disconnecting the motor means from its respective adjusting means, and manually controlled adjusting means for each of the slides, the manually controlled adjustment means for the slide which is adjustable along the transverse axis being a rack and pinion drive, the manually controlled adjustment means for the slides which are adjustable along the vertical and horizontal axes being a hand operated lever, said sensing means including an interchangeable power driven sensing means and rigid sensing means.

2. A mould copy milling machine which is convertible between automatic and manual operation, said machine comprising a body, three slides adjustable along respective mutually perpendicular axes constituting vertical horizontal and transverse axes, cutting means supported on the slide which is adjustable along the vertical axis, sensing means on the latter slide for controlling the adjustment of said slides, power driven adjusting means controlled by the sensing means for adjusting the position of the slides along their respective axes, means for disconnecting the power drive of the adjusting means and rendering the same inoperative, and manually controlled adjusting means for each of the slides, the manually controlled adjustment means for the slide which is adjustable along the transverse axis being a rack and pinion drive, the manually controlled adjustment means for the slides which are adjustable along the vertical and horizontal axes being a hand operated lever, said sensing means including an interchangeable power driven sensing means for automatic operation and a rigid sensing means for manual operation.

3. A method of controlling a mould copy milling machine for automatic and manual operation comprising supporting a cutter and a sensing device for common movement along three mutually perpendicular axes, interchanging a power driven sensing device and a rigid sensing device for respective automatic and manual operation of the cutter, the power driven sensing device automatically causing the drive of the cutter along said axes, disengaging the cutter from automatic drive when the rigid sensing device is used and manually adjusting the cutter when the rigid sensing device is used.

References Cited by the Examiner

UNITED STATES PATENTS

| | | | |
|---|---|---|---|
| 2,412,619 | 12/1946 | Kindermann et al. | 90—13.5 |
| 2,967,463 | 1/1961 | Jensen | 90—13.5 |

WILLIAM W. DYER, JR., *Primary Examiner*.

G. A. DOST, *Assistant Examiner*.